Figure 3:
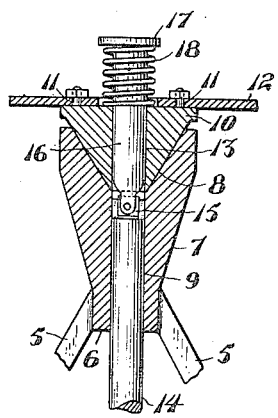

C. T. SHAFFER.
COMBINED AMUSEMENT DEVICE AND INSTRUCTION APPARATUS.
APPLICATION FILED NOV. 18, 1912.
1,071,101.
Patented Aug. 26, 1913.
2 SHEETS—SHEET 1.
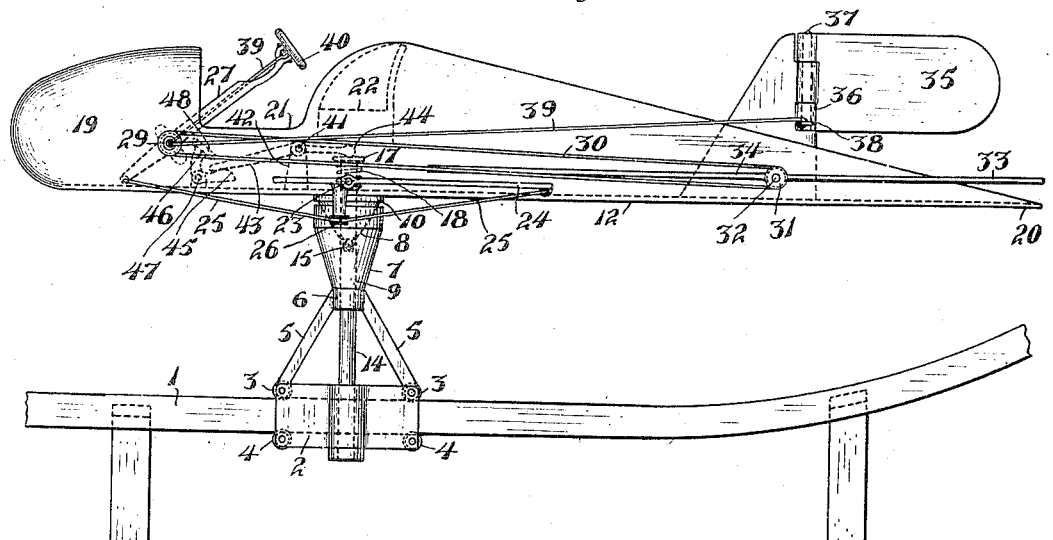
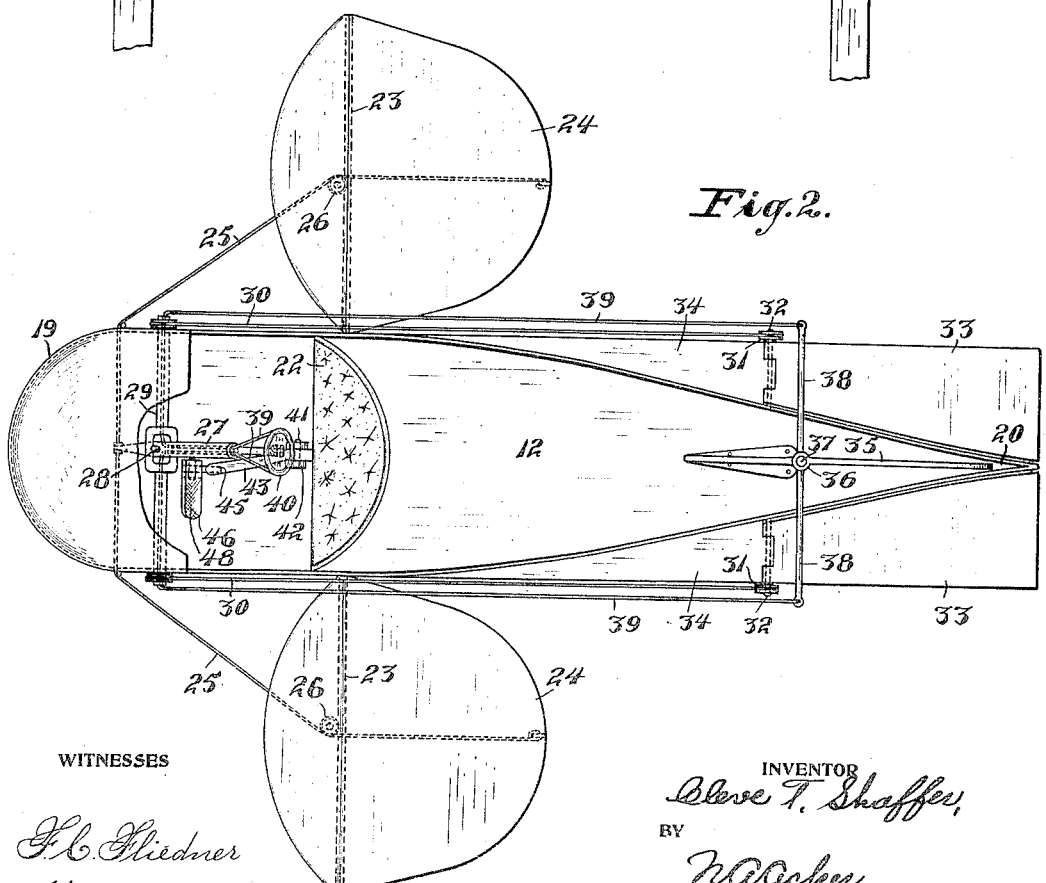
WITNESSES
INVENTOR
Cleve T. Shaffer,
BY
N. A. Acker
his ATTORNEY

UNITED STATES PATENT OFFICE.

CLEVE T. SHAFFER, OF SAN FRANCISCO, CALIFORNIA.

COMBINED AMUSEMENT DEVICE AND INSTRUCTION APPARATUS.

1,071,101. Specification of Letters Patent. Patented Aug. 26, 1913.

Application filed November 18, 1912. Serial No. 732,105.

*To all whom it may concern:*

Be it known that I, CLEVE T. SHAFFER, a citizen of the United States, residing in the city and county of San Francisco and State of California, have invented certain new and useful Improvements in Combined Amusement Devices and Instruction Apparatus, of which the following is a specification.

The hereinafter described invention relates to an improved amusement device adapted to be employed in amusement parks or the like, and by the use of which a passenger may become expert in the art of aviation, and has for its principal object to provide an apparatus of the aeroplane type so constructed and mounted that the passenger thereof may enjoy the flight of the aeroplane while the stability of the same is not affected by the air currents, or the passenger may permit the aeroplane to be affected by the air currents and be compelled to maintain steady the equilibrium of the same while it is being propelled through the air.

The invention has for its principal object to provide a propelled captive device of the aeroplane type adapted to carry a passenger, which will assist in the instruction of aviators and at the same time provide an amusement device, and by the use of which will subject the passenger to the same difficulty in maintaining steady the equilibrium of the aeroplane as if the same were in actual flight.

A further object is to provide a device of the above character with means for normally maintaining the same steady while traveling, should the passenger not desire the sensations of a realistic aeroplane flight, or when the passenger is entering or alighting from the apparatus.

Another and important object is to provide an apparatus of the above character with the usual balancing planes, and rudder for balancing the same and directing the movement thereof, and to propel the same by gravity or any suitable power.

The invention consists in a device of the aeroplane type adapted to be propelled in any suitable manner and having the usual balancing planes and rudder, a supporting trackway therefor, a flexible connection between the trackway and the aeroplane, and means under the control of the passenger for permitting universal movement of the aeroplane relative to the supporting trackway as the plane is propelled along said track.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction, within the scope of the appended claims, may be resorted to without departing from the spirit or sacrificing any of the advantages of the invention.

To more fully comprehend the invention reference should be had to the accompanying drawings, wherein is disclosed one form of my invention wherein—

Figure 4:
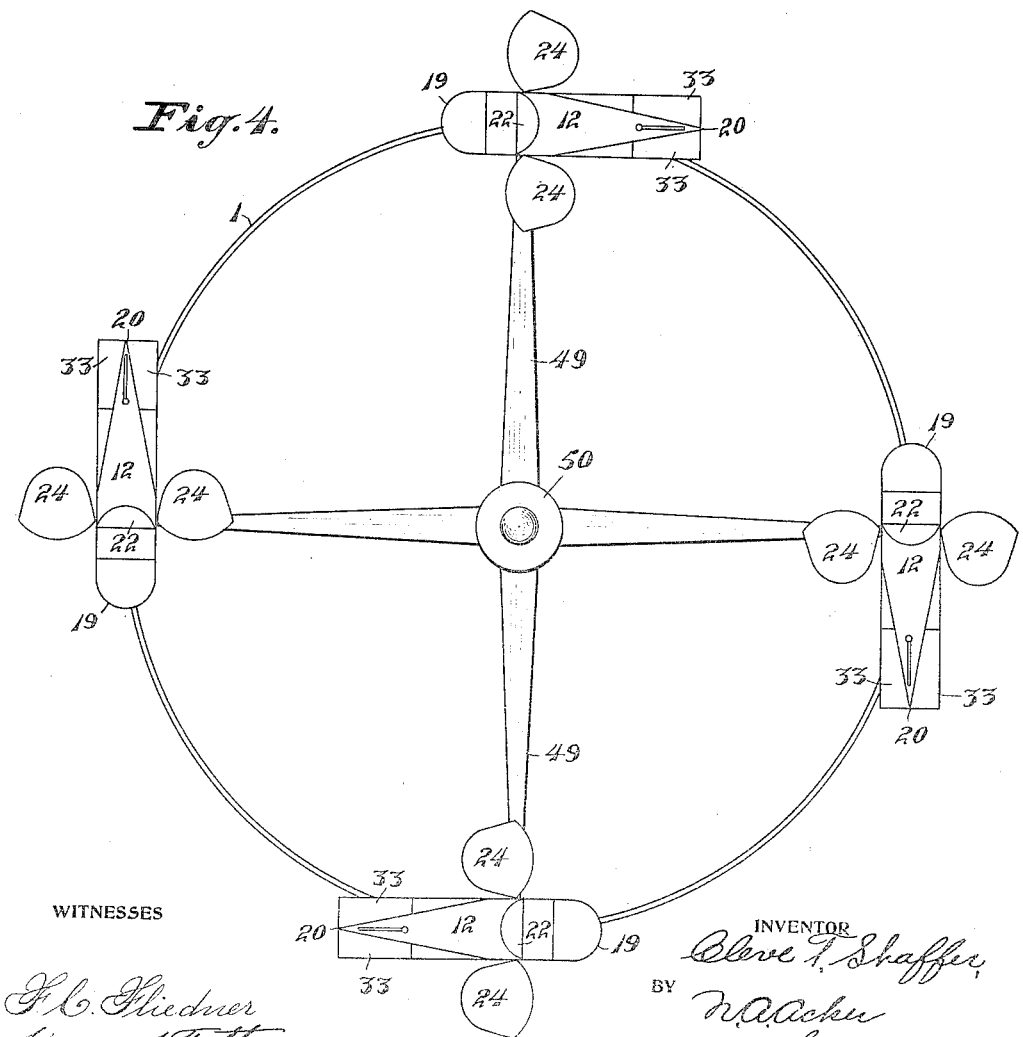

Figure 1 is a side elevation disclosing the supporting track, the carrier mounted thereon, the aeroplane supported by the carrier and provided with side and rear planes and steering rudder, and the means for permitting universal movement of the aeroplane independently of the carrier. Fig. 2 is a top plan view of the aeroplane disclosing the side balancing planes, the rear elevating plane, the rudder, and the means for operating said planes and rudder. Fig. 3 is a sectional view of the flexible connection between the aeroplane and the supporting carrier. Fig. 4 is a view in plan of a plurality of my devices employed in the form of a merry-go-round.

Referring more particularly to the drawings, the reference numeral 1 designates a track of any suitable form and supported in any suitable manner, and mounted on said track is a carriage 2 provided at its ends with upper and lower grooved rollers 3 and 4 which rotate respectively on the upper and lower faces of said track. Extending upwardly from the ends of said carriage 2 are inwardly inclined arms 5, connected at their upper ends by a collar 6, formed at the lower end of a base member 7, which is provided on its upper surface with an inverted conical shaped recess or seat 8, which terminates at its apex in a cylindrical bore 9, communicating with the interior of the collar 6.

Seated in the conical recess 8 of the support 7 is a conical base 10, secured at its upper surface by bolts 11 to the under portion of an aeroplane 12, hereinafter more fully described, and said base 10 is provided through its center with a cylindrical bore 13, which, when the parts are in position, as disclosed in the drawings, communicates with the bore 9.

Extending upwardly from the carriage 2 supported thereby, and projecting through the collar 6 and bore 9, is a supporting shaft 14, which is connected at its upper end through a universal joint 15 with the lower end of a shaft 16, the upper end of which extends through, and is rotatably mounted in the bore 13. The extreme upper end of said shaft 16 which projects through the floor of the aeroplane is provided with an enlarged head 17 between which, and the upper surface of the base 10, is positioned a tension spring 18, coiled about the upper portion of said shaft. It will be observed that the spring 18 exerting pressure on the upper surface of the base 10 will draw the shaft 16 upwardly and force the conical portion of the base 10 into the conical recess 8 of the support 7, and will prevent the universal movement of the aeroplane relative to its support.

The aeroplane consists in a suitable body constructed of any suitable material and disclosed in the drawings as formed with a rounded front 19, tapering to a pointed rear 20, and said body is provided adjacent its forward end, above the point of attachment of the base 10 with a cut-out portion 21, which provided a space for a passenger, and constructed in said portion is a seat 22 for the passenger. Extending outwardly from each side of the body at diametrically opposite sides thereof are arms 23, which support suitable flexible balancing planes 24 of any suitable shape, and to the rear portions of which are secured the ends of flexible cords 25, which extend around idlers 26 secured to the arms 23, and the inner ends of said cords are secured to the lower end of a tubular operating lever 27, which is pivoted, as at 28, to a tubular supporting shaft 29 rotatably mounted in journals at the sides of the aeroplane frame, and carrying at its ends suitable grooved disks around which extend flexible cords 30, the opposite ends of which extend around correspondingly grooved disks 31, secured to the ends of a shaft 32, journaled transversely through the rear of the body 12, and which carries the elevating planes 33, pivotally mounted at their forward ends to laterally projecting portions 34 extending from the body 12. A rudder 35 is provided at the rear of the body, and the same is pivoted as at 36 to a pin 37, projecting upwardly from the rear of said body and extending laterally from said rudder are the arms 38, to the ends of which are connected cords 39, which extend forwardly of the body, and through the tubular shaft 29 into the tubular lever 27, said cords extend outwardly one on each side of the upper end of said tubular lever and are connected at their ends to opposite peripheral edges of a wheel 40 pivotally mounted on the upper end of said lever.

From the above description it will be observed that by the passenger moving the lever 27 forwardly or rearwardly, that the shaft 29 will be rotated and the elevating planes 33 will be actuated, and that by swinging the lever 27 from side to side on its pivotal point, and maintaining the wheel 40 in a horizontal position, that the rudder 35 will be operated, and the balancing plane on that side of the body opposite to which the turn is being made will be flexed to elevate that side of the body. It will be apparent that the rudder, balancing planes, and elevating planes are all controlled from a single control gear which is readily operatable by the occupant or passenger seated in the car.

Pivotally mounted, as at 41, to an upstanding member 42, secured to the frame 12, adjacent the head 17 of the shaft 16, is a lever 43, the end 44 of which rests on the head 17 and the opposite end of which projects over a cam surface 45 of a pedal 46, pivoted as at 47 and provided with a foot receiving surface 48, arranged within convenient reach of the passenger.

It will be observed that upon the passenger pushing the pedal forwardly, that the end contacting with the cam surface will be raised, the opposite end will be lowered exerting pressure on the head 17 of the shaft 16 which will through the upstanding member 42 raise the base 10 from the conical support 8, against the tension of the spring 18. The raising of the base 10 on its shaft will elevate the body of the aeroplane and the same will be permitted to pivot universally relative to the support 7, and the balancing of the aeroplane will now be under control of the passenger. It will be apparent upon the passenger raising the base 10 on its shaft and maintaining the conical portion of said base in spaced relation to the conical recess 8 of the support 7 that a free movement of the aeroplane relative to the carriage will be permitted, this being accomplished by the universal joint 15, and it will be also observed that the aeroplane being supported by a single universal joint will be subjected to the action of gravity and will tilt at various angles within the limit of the side walls of the conical recess 8, and that the passenger may right the aeroplane and counteract the deflections or movement caused by gravity by the operating of the various planes and the rudder and flexing the same to an angle of incidence to the air through which they are traveling.

Referring to Fig. 4, the track 1 is disclosed as being circular in plan and on which are mounted a plurality of aeroplanes 12 constructed as above described, and from the carriage of each extends an arm 49 connected to a common central rotatably mounted hub 50 which is driven by power derived from any suitable source.

From the above description it will be observed that an instruction as well as an amusement apparatus of the aeroplane type has been provided which is capable of being propelled through the air, is safe, and may be either maintained in a level position automatically, or may be subjected to the action of gravity and tilt at various angles, to be righted by the passenger thereof regulating the angle of incidence of the planes to the air through which the same are propelled.

Having thus described my invention what I claim as new and desire to protect by Letters Patent is:—

1. In an apparatus of the class described and in combination with an aeroplane, of a supporting track therefor, means for propelling the aeroplane relative to said supporting track, flexible connections between said supporting track and said aeroplane, and means for controlling the flexibility of said flexible connections for regulating the universal movement of the aeroplane relative to the supporting track.

2. In an apparatus of the class described and in combination with an aeroplane, of a supporting track therefor, means for propelling the aeroplane relative to its supporting track, flexible connection between said aeroplane and said supporting track, means for maintaining said flexible connection rigid, and means for permitting universal movement of the aeroplane relative to the supporting track.

3. In an apparatus of the class described, the combination with an aeroplane, of a supporting track therefor, means for propelling the aeroplane relative to its supporting track, a flexible connection between said aeroplane and the supporting track, and means under the control of a passenger within the aeroplane for controlling the flexibility of the said flexible connection for regulating the universal movement of the aeroplane during the course of its flight relative to said track.

4. In an apparatus of the class described, the combination of an aeroplane, of an inclined supporting track therefor and down which said aeroplane is adapted to travel, a flexible connection between said aeroplane and said supporting track, and means under control of a passenger within the aeroplane for controlling said flexible connection for permitting universal movement of the aeroplane during its travel relative to said track.

5. In an apparatus of the class described, the combination with an aeroplane provided with the usual balancing planes, elevating planes and steering rudder, of means under the control of the passenger within the aeroplane for operating said balancing planes, elevating planes and steering rudder of a supporting track for said aeroplane, means for propelling the aeroplane relative to its supporting track, a flexible connection between the aeroplane and the supporting track, and means under the control of the passenger within the aeroplane for permitting universal movement of the aeroplane during the course of its flight relative to said track.

6. In an apparatus of the class described, the combination with an aeroplane provided with the usual balancing, elevating planes and steering rudder, of means under control of a passenger within the aeroplane for operating said balancing planes, elevating planes and rudder, a supporting track for said aeroplane, means for propelling the aeroplane relative to its supporting track, a flexible supporting connection between said aeroplane and the supporting track, and means under control of the passenger within the aeroplane for controlling the flexibility of said connection.

In testimony whereof I have signed my name to this specification in the presence of two subscribing witnesses.

CLEVE T. SHAFFER.

Witnesses:
  HARRY A. TOTTEN,
  D. B. RICHARDS.